United States Patent [19]

Kilwin

[11] Patent Number: 4,746,320
[45] Date of Patent: May 24, 1988

[54] TORQUE LIMITING CLUTCH

[75] Inventor: Thomas C. Kilwin, Bridgeton, Mo.

[73] Assignee: Unidynamics Corporation, St. Louis, Mo.

[21] Appl. No.: 248,020

[22] Filed: Mar. 26, 1981

Related U.S. Application Data

[63] Continuation-in-part of Ser. No. 103,844, Dec. 14, 1979, Pat. No. 4,373,923.

[51] Int. Cl.[4] .............................................. F16D 7/06
[52] U.S. Cl. ................................... 464/36; 192/56 R
[58] Field of Search .................. 464/36, 35; 192/56 R

[56] References Cited

U.S. PATENT DOCUMENTS

| | | | |
|---|---|---|---|
| 1,865,356 | 6/1932 | Daum | 464/36 X |
| 1,883,164 | 10/1932 | Vassakos | 464/36 X |
| 2,493,232 | 1/1950 | Dodge | 464/36 X |
| 3,095,955 | 7/1963 | Orwin | 192/56 R |
| 3,270,844 | 9/1966 | Orwin | 192/56 R |
| 3,405,790 | 10/1968 | Orwin et al. | 192/56 R |
| 3,429,407 | 2/1969 | Orwin et al. | 192/56 R |
| 3,599,067 | 8/1971 | Wallis | 464/36 X |
| 3,722,644 | 3/1973 | Steinhagen | 464/36 X |
| 4,220,230 | 9/1980 | Hansen | 192/56 R |
| 4,294,340 | 10/1981 | Kunze | 464/36 X |

FOREIGN PATENT DOCUMENTS

| | | | |
|---|---|---|---|
| 256607 | 3/1949 | Switzerland | 464/36 |
| 846352 | 8/1960 | United Kingdom | 464/36 |
| 386176 | 9/1973 | U.S.S.R. | 464/36 |

Primary Examiner—Daniel P. Stodola
Attorney, Agent, or Firm—Paul M. Denk

[57] ABSTRACT

Torque limiting clutch comprising a driving member and driven member bearing mounted together, with the driving member having a flange integrally extending from its one end, and having locating slots therein, for accommodating a series of ball detents, and with a spring and adjustable nut biasing against the detents for forcing them into a seating relationship upon bearing seats provided upon a rotatable member formed integrally of the driven member; a structured support connects with the rotatable member and extends concentrically along the length of the driving member, and provides support for the adjustable screws and springs mounted therein, with the structured support further furnishing enclosure for these operating components of the clutch for assuring their freedom from contamination during routine clutch usage and operation. Various races are biased against the ball detents and assure the distribution of uniform pressure against the detents in their adjustable relationship with the rotatable member of the driving member, and provide freedom for shifting of the detents as they are unseated during clutch disconnection. Various rods and a displacement plate are connected to the races and are shiftable during clutch disconnection so that a micro or other switch can be actuated for shutting off the operations of the connected machinery when excessive torque has been encountered and clutch disconnection occurs.

1 Claim, 1 Drawing Sheet

TORQUE LIMITING CLUTCH

CROSS REFERENCE TO RELATED APPLICATION

The subject matter of this application comprises an improvement upon and constitutes a continuation-in-part application of the application of Thomas C. Kilwin, relating to Improved Torque Limiting Overload Coupling, Ser. No. 103,844, filed on Dec. 14, 1979, and owned by a common assignee, now U.S. Pat. No. 4,373,923.

BACKGROUND OF THE INVENTION

This invention relates generally to means for coupling machinery components together, and more specifically pertains to an improved torque limiting clutch that interconnects principally between the speed reducer and machinery it operates in order that operational power to machinery can be curtailed upon encountering excessive impeding forces that exceed the acceptable clutch designed torque.

There are a great variety of torque governing couplings available in the prior art, with most of the couplings for use in conjunction with the operations of a motor, or its speed reducer, and interconnecting within the main drive shaft for affording a disconnection or shut-off of the prime mover when excessive torques are encountered by the driven machinery during operation. Essentially, such torque limiting couplings are designed for the purpose of preventing excessive damage to machinery when torque forces are encountered that exceed predetermined levels, such as when tool binding, or the like, may occur at the situs where a machine tool function is being performed. The damages encountered when such adverse conditions prevail are well known in the industry, and can lead to tool damage, or even motor burn-out, in the event that machinery is not shut-off when a machine tool mechanical disruption occurs.

Most of the safety devices associated with torque limiting mechanisms have been designed in the category of mechanically actuated tripping means, and such can be seen in the Schultz U.S. Pat. No. 2,771,171, and which principally incorporates the use of magnetic pole pieces as the means for determining the range of torque that can be tolerated, but which when exceeded, effects the coupler's breakdown.

A variety of other magnetic coupling devices, and principally for preventing overloading of machinery during routine usage, is shown in the earlier Cowell U.S. Pat. No. 3,221,389, in addition to the Gollos U.S. Pat. No. 3,339,819. Further types of magnetic torque limiting devices, and specifically for use in low force operating mechanisms, can be seen in the two United States patents to Tiffany, U.S. Pat. No. 1,136,739, and Cornwell, U.S. Pat. No. 2,300,778.

The combination of magnetic couplers incorporating spring biasing means for gauging torque forces is shown in the earlier patent to Allen, U.S. Pat. No. 3,053,365, in addition to other forms of disconnectors as shown in the United States patents to Wolley, U.S. Pat. No. 3,277,669; Hornschuch, et al., U.S. Pat. No. 3,159,725; U.S. patent to the Spodig, U.S. Pat. No. 2,943,216; the U.S. patent to Beeston, Jr., U.S. Pat. No. 2,885,873; and finally, the United States patent to Hoad, U.S. Pat. No. 2,746,691, and which utilizes a frictional connection between magnetic pieces for determining the degree of torque necessary to effect discoupling through its force limiting device.

Various ball detent couplers that are available in the art, are shown in the U.S. Pat. Nos. 3,701,404; 3,680,673; 3,893,553; 3,981,382; 3,979,925; 3,942,238; 3,927,537; 3,930,382; and 3,866,728.

Other mechanical type of torque limiting couplers. and which incorporate spring biasing means that operate in conjunction with coupling balls, are shown in the United States patent to Steinhagen, U.S. Pat. No. 3,774,837, in addition to the early patent to Bassakos, U.S. Pat. No. 1,883,164. In addition, another patent to Steinhagen, U.S. Pat. No. 3,722,644, discloses the adjustment of torque forces within a coupler through the use of balls held into position by means of spring means. The patent to Ely, U.S. Pat. No. 541,489, discloses another power transmitting mechanism, while a torque release drive coupling means is shown in the United States patent to Vuceta, U.S. Pat. No. 4,006,608. Other United States patents disclosing other variations upon slipping clutch means are shown in the patent to Barnes, U.S. Pat. No. 2,818,712; the patent to Landrum, U.S. Pat. No. 3,050,965; the United States patent to Leonard, U.S. Pat. No. 3,942,337; the patent to Maisch, U.S. Pat. No. 1,566,553; and the patent to Root, et al., U.S. Pat. No. 4,046,237.

One of the early versions of the current invention is shown in the United States patent to Woltjen, U.S. Pat. No. 4,174,621, from which this current invention derives, and which is owned by a common assignee, and discloses means for regulating the positioning of bearings between driving and driven shafts in order to effect machinery disconnection in the event that adverse conditions are encountered.

Finally, various manufacturers have been marketing their own particular style of overload tripping devices, or what are generally categorically defined as release clutches, and such are distributed by companies such as Centric Clutch Company, of Woodbridge, New Jersey, Stearns Electric Division of FMC Corporation, Milwaukee, Wisconsin, by the Browning Division of Emerson Electric Company, in St. Louis, Mo., and the David Brown Sadi S.A., of Brussels Belgium, in addition to the Fail-Safe Overload Device manufactured by Livernois Automation Company, of Dearborn, Mich. The latter device is significant in showing the positioning of steel balls within the transmission system, with said balls being held in position by means of resettable springs, to assure some degree of control over the amount of overload required for effecting mechanical disengagement when excessive torque is encountered.

The invention described in the torque limiting overload coupling application set forth in the cross reference to a related application generally depicts a structured arrangement for suspending detent balls, only on one circumferential half of the same, within both the driving and driven means of the coupling, but also provides a disclosure of structure that is applicable and useful in the formation of the improved torque limiting clutch of this invention. For example, the concept of staggering the detent means in their seating relationship upon the rotatable member, of this current invention, is shown in said copending application, with the advantage being that inherent single positioning features are attained in the relationship between the driving means and the driven means during clutch disconnection, so that the detent means do not constantly encounter and impact against adjacent bearing seats as disconnection occurs, or while some relative rotation may happen between these two components. But, in addition, and as explained in said earlier application, the uniform distribution of the detent means and their seating within equi-spaced bearing seats is also analyzed, and is an attribute that may yet be adaptable for use in conjunction with the torque limiting clutch of this current invention.

It is, therefore, the principal object of this invention to provide an improved torque limiting clutch wherein ball detent means are positioned and held between the driving and driven means through uniformity of accurately determined pressure applied to all the positional detent means and thereby assure a finer accuracy in the degree of torque necessary to effect clutch disconnection.

Another object of this invention is to provide a torque limiting clutch which has been improved to assure greater accuracy in its response to torque pressures generated during machinery usage and in which the clutch of this invention is installed.

Still another object of this invention is to provide an improved torque limiting clutch in which its operating components, as adjusted, may be totally encased so as to assure their freedom from contamination and resultant maladjustment such as occurs with other clutches of current design.

Still another object of this invention is to provide a disconnect clutch which readily externally disposes its adjustment means for ease of manipulation by any machine operator, so that the clutch may be promptly reset and function to disconnect at specified torques during machinery usage.

Yet another object of this invention is to provide a torque limiting clutch which may be interconnected between a series of machinery shafts, flanges, and dials.

Another object of this invention is to provide a machinery clutch that may interconnect between the speed reducer and the indexing machinery rendered functional through its prime mover.

Yet another object of this invention is to provide a disconnect clutch wherein its various driving and driven components are conveniently bearing mounted with respect to each other so as to assure their near frictionless relative rotation with respect to each other, but yet assure total and adequate support for its various components as assembled for usage.

Another object of this invention is to furnish a signal or actuator type plate or other means that is responsive to immediate clutch disconnection so that a micro or other switch can be instantaneously actuated for shutting off power when the clutch disconnects.

These and other objects will become more apparent to those skilled in the art upon reviewing the summary of this invention, and upon undertaking a study of the description of its preferred embodiment, in view of the drawing.

SUMMARY OF THE INVENTION

This invention relates to improvements made to a torque limiting overload clutch, of the type that is used in conjunction with the output shaft from a prime mover, such as a motor, or a speed reducer, and which then interconnects with another shaft, flange, or the dial of an indexing apparatus. Due to the unique construction of this particular clutch, various of its operating characteristics have been substantially improved, and enhanced particularly for accuracy, during its operations. In addition, the structure of the overload clutch has also been improved from the standpoint of providing continuous accuracy in its operation, once it has been adjusted, such principally being achieved through the formation of an outer enclosure formed as its structured support and which renders its internally arranged adjustable and operating components free of any contamination, as usually generally pervades around operating machinery of this type.

More specifically, this invention contemplates the formation of the clutch incorporating the usual driving and driven means, in this instance the driving means being substantially contained within the said driven means, or the various structural members appended to it. The driving means includes a shaft coupling member that extends substantially but not necessarily entirely through the driven means, and has an integral flange radiating outwardly from approximately its inner one end. The flange incorporates a series of slots or alignment apertures, for use for positioning the detent means, or ball detents, used for normally holding the driving and driven means together during normal and routine usage of machinery, in which this clutch is incorporated. Then pressure is exerted upon one surface of the series of ball detents to urge them into a seating relationship within the bearing seats formed inherently upon the surface of a rotatable member formed integrally of the structure of the driven means of this invention and arranged contiguously with the driving means flange.

One of the principal improvements of this invention is the connection of a structured support, generally in the shape of a sleeve, mounting upon the rotatable member of the driven means, and extending substantially concentrically in arrangement with the driving means arranged centrally thereof. The structured sleeve preferably is formed as an enclosure, being generally impervious to the passage of any deleterious elements or particles therethrough, so that contamination is precluded from attaining access to the operating components of this particular clutch. This structured support, or enclosure, at its opposite end, is formed generally into the shape of a pair of inner and outer sleeves or surfaces, being integrally connected together through a structured shoulder, and in which a series of apertures are arranged and into which the adjustment means or adjustable screws are threadedly disposed and through which a readjustment in the degree of pressure exerted upon the detent means may be achieved, and for determining the quantity of torque necessary for attaining clutch disconnection when excessive force is encountered during machinery usage. These adjustable screws have their faces exposed to the exterior, and have the usual means provided thereon for being manipulated by a screwdriver, Allen wrench, or other tool, to attain such adjustment, while the inner ends of each screw biases against a spring, and which is also urged against one or more races that exert uniform pressure against the ball detents for maintaining their seating relationship with the rotatable member of the driven means.

Another attribute and improvement for this particular disconnect clutch is the arrangement of an actuator plate or means, externally of the internal operating components of said device, and which plate is structurally supported by means of rods, or other fasteners, to the various races previously described, so that as any unseating of the ball detents occur, the actuator plate will be immediately responsive thereto, be displaced by a dimension equivalent to the depth of the seating of the said detents within their bearing seats, and which displacement has been gauged to be sufficient to obtain a micro or other switch actuation and which may trigger a deenergization of the motor providing power to the machinery, or shut-off the operating components upon the machinery so as to minimize or completely curtail any resultant damage which may otherwise occur if such machinery and motor continues operation after excessive resistive torque is encountered.

The adjustment in the torque setting for operation of this disconnect clutch can be conveniently and facilely performed simply through a manipulation of the torque adjustment screws as previously explained. And, graduations have been determined for providing reasonable preciseness in the torque setting for this particular clutch. For example, the following chart provides an analysis of the quantity of torque settings that can be made for four of the models for the preferred embodiment of this particular invention. The number of turns displayed indicate that the tightening of the torque adjustment screws to a maximum, that being tightened to a full seating, no further turns, which means that the screws are tightened to a maximum insertion within the structured support of the clutch. Then, backing off each screw the number, or fractional number, of turns displayed gradually eases the pressure upon their associated spring means, which means that the amount of torque, in inch-pounds, necessary to cause clutch disconnection will be gradually lessened to the amount displayed. In the preferred embodiments, the RTL-5 model for this disconnect clutch incorporates approximately four adjustment screws, and associated springs, with five detent means being pressured thereby. The type of spring that may be used, by way of example, in association with the adjustment screw is a No. S-06HI0 spring, obtained from the Brown Group Inc., of Corry, Pa. This spring, being four in number, as used in the RTL-5 model for this clutch is the type of spring when compressed develops force at approximately a rate of 424 pounds per inch. And, when each spring is fully compressed, it develops approximately 75 pounds of pressure, which cumulatively with the other four springs contained in this particular model for a clutch, when fully adjusted to their tightest position, establishes the 500 inch-pounds of trip torque for this operating clutch. The identified RTL-20 model for this clutch also incorporates four adjustment screws and associated springs in its construction, and, just as in the RTL-5 model, has five detent balls being held in place thereby. The utilized springs develop pressure at the rate of 880 pounds per inch, and when fully adjusted, have an applied pressure of approximately 249 pounds of force, which springs jointly develop a trip torque, when fully adjusted, at the 2000 inch-pounds level. The Model RTL-60 clutch also incorporated four springs and associated adjustment screws in its construction, and which bias five detent balls into its seating relationship during normal clutch usage. Each spring can compress at a rate of approximately 1848 pounds per inch, and when fully compressed, each spring develops a pressure of 600 pounds, with the combined springs when fully adjusted providing for a trip torque at the shown 6000 inch-pounds setting. Finally, the model RTL-120 clutch incorporates six springs and associated adjustment screws in its construction. Each spring is compressible at a rate of approximately 1816 pounds per inch. And, when each spring is fully compressed, it develops a force of approximately 688 pounds, which springs cumulatively establish the 12,000 inch-pounds of static trip torque, as shown. Other models or modifications to this disconnect clutch can use, and have been designed, incorporating a differing number of ball detents, in their associated seating relationship within the bearing seats provided within their driven member, and modifications incorporating as many as twelve or more detent means have been constructed.

In a more detailed analysis, various adjustments can be made to the disconnect clutch of this invention, and upon reviewing the following chart, it can be seen that as each adjustment screw for each model of the clutch is backturned, by either the whole or fractional number of turns shown, the trip torque setting for the clutch can be significantly reduced. Thus, precision in the threshold trip torque that need be encountered for disconnecting the clutch during machinery operation can be readily determined as shown in the following chart:

| NO. OF | APPROX. STATIC TRIP TORQUE (IN.-LBS.) | | | |
|---|---|---|---|---|
| TURNS | RTL-5 | RTL-20 | RTL-60 | RTL-120 |
| 0 | 500 | 2000 | 6000 | 12000 |
| ½ | 450 | 1900 | 5500 | 11500 |
| 1 | 375 | 1700 | 5000 | 10500 |
| 1½ | 300 | 1500 | 4500 | 9500 |
| 2 | 225 | 1300 | 4000 | 9000 |
| 2½ | 150 | 1200 | 3500 | 8000 |
| 3 | 100 | 1000 | 3000 | 7000 |
| 3½ | — | 800 | 2500 | 6000 |
| 4 | — | 600 | 2000 | 5000 |
| 4½ | — | 500 | 1700 | 4500 |
| 5 | — | 400 | 1400 | 4000 |
| 5½ | — | — | 1200 | 3500 |
| 6 | — | — | — | 3000 |
| 6½ | — | — | — | 2400 |

BRIEF DESCRIPTION OF THE DRAWINGS

In the drawing, FIG. 1 provides a partial isometric view of the improved torque limiting clutch of this invention and wherein its driving and driven members are associated together through the seating of their intermediate ball detents and which provides for their simultaneous rotation during normal usage of the associated machinery.

DESCRIPTION OF THE PREFERRED EMBODIMENT

Figures 1, 2:
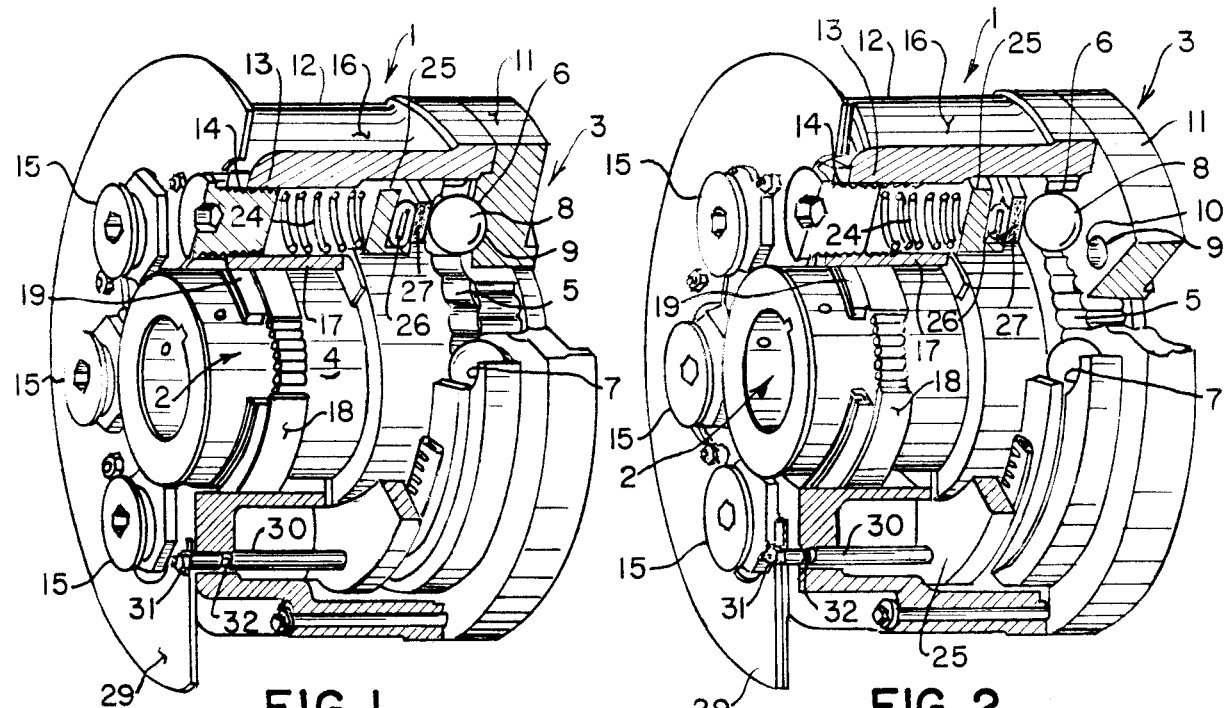
FIG. 2 provides a similar view of the torque limiting clutch of this invention as shown in FIG. 1, with the one shown ball detent having been unseated from its bearing seat as when clutch disconnection occurs through the machinery's having encountered an excessive torque.
Figure 3:
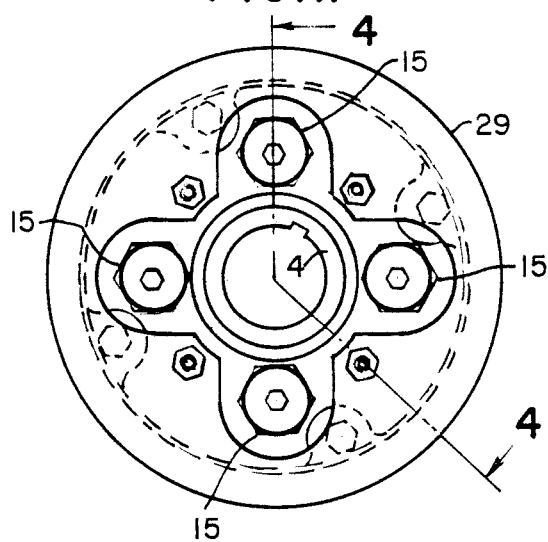
FIG. 3 provides an end view of the torque limiting clutch, as shown in FIG. 1, and displaying, for this model, the four adjustment means for providing trip torque settings for said clutch.
Figure 5:
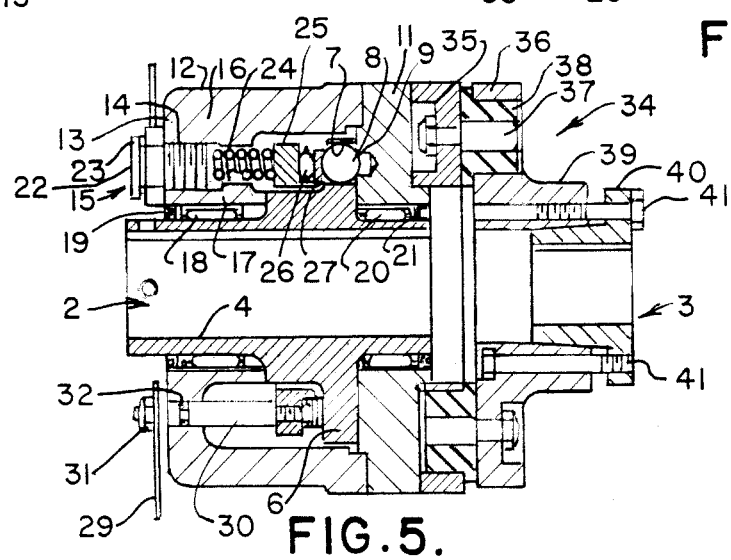
FIG. 5 provides a sectional view similar to that shown in FIG. 4, but with an adaptor means and hub being connected onto its driven means for affording shaft-to-shaft connection during usage of this model of the torque limiting clutch.

In referring to the drawing, and in particular FIGS. 1 and 2, there is shown the improved transmission type torque limiting clutch 1 of this invention, and which includes a driving means 2 and which is coupled for attaining rotation for a driven means 3. This particular style for the clutch, or torque overload device, is of the type that is generally referred to in the industry as a sprocket mount, since the driven means 3 is configured for providing a flange drive mount, such as the type that may be connected to the dial of an indexing table or machine. But, other forms of connection are contemplated, such a shaft-to-shaft connection, which will be subsequently described when reviewing the subject matter of this invention as depicted in FIG. 5.

In referring once again to FIGS. 1 and 2, the driving means or member 2 includes a shaft coupling member 4 and which has extending integrally and radially from its inner end, as at 5, a flange 6, which is designed having one or more apertures or slots, as at 7, formed therethrough, and for accommodating a series of detent means, or the ball detents, as at 8, as shown. The number of ball detents included within the clutch has been previously analyzed within the summary of this invention.

These ball detents 8 are normally arranged upon a circumference with respect to the driving means 2 that places the said ball detents into alignment with the bearing seats 9, as shown, so that under normal operating conditions the driving and driven means will be reasonably held together, through the agency of this seating relationship of the ball detents, within their respective bearing seats; to provide for simultaneous rotation of these components, and likewise rotational movement to the shaft, flange, dial, or other component being turned through the agency of a motor, and normally a speed reducer, combination, associated with machinery of this type. The mating relationship between the driving and driven means, through the seated ball detents 8 is shown in FIG. 2, to provide for disconnection between the driving and driven means, as disclosed. Thus, when such occurs, the driving means may continue some rotation, whereas turning of the driven means may cease.

While the bearing seats 9 in the preferred embodiment are tapered or 90° formed apertures, it may also be commented, and as shown in my prior application, that these bearing seats may be contoured, as along their peripheral edges 10, so as to provide for convenient seating of the ball detents 8 therein, under normal operating conditions, and to assure precision in the quantity of torque necessary to attain clutch disconnection. In addition, such contouring does alleviate damage to the ball detents in the event that frequent unseating should occur.

Figure 4:
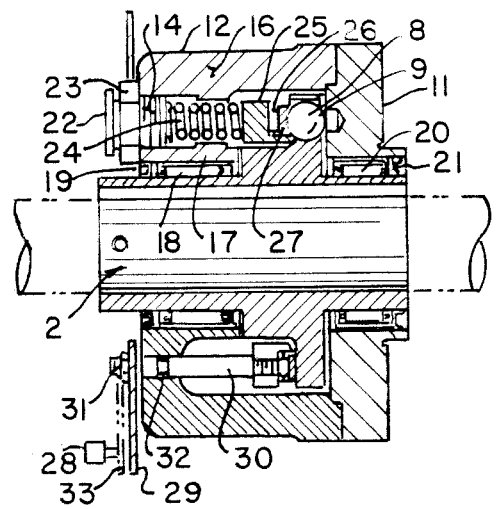
FIG. 4 provides a sectional view of the disconnect clutch of FIG. 3, and also showing the relationship of the microswitch that may be triggered through a displacement of the actuator plate as ball detent unseating occurs upon the clutch encountering excessive torque.

The driven means 3 includes a rotatable member 11, as previously described, and has a structured support 12 connected therewith and extending concentrically with respect to the driving means 2, with said structured support extending approximately up to the front edge of the said driving means, and being formed having an upper boss-like portion 13, and through which a series of apertures are provided, as at 14, and which are threaded as at their upper end, for reception of the adjustment means 15, which are useful for resetting and gauging the quantity of torque necessary to attain clutch disconnection, as previously analyzed. Essentially, the structured support 12 includes an outer surface 16 and an inner surface 17 with the outer surface providing for full enclosure of the operating components contained within this disconnect clutch, so as to assure their freedom from contamination or the entrance of any deleterious particles therein, and which could disrupt the proper operation of this clutch, or its precision functioning at particular predetermined and preset degrees of torque. On the other hand, the inner surface 17 of the structured support 12 is generally arranged in contiguity with the surface of the shaft coupling member 4, and being bearing mounted therewith through the arrangement of the bearing race 18, so as to assure freedom of relatively different movements between the driving means and the driven means in the event that clutch disconnection should occur. Furthermore, so as to assure the contamination free atmosphere within the structured support 12, and also to assure the lasting operation of the components therein, including the ball detents 8, a seal or O-ring 19 is provided, as shown, and thereby may properly envelope and contain any lubricating oils that may be located therein, to seal it in position, while at the same time providing the further attribute of preventing any dirt from entering into this vicinity. As can be seen in FIG. 4, a similar type bearing race 20, having a sealing gasket or O-ring 21 associated therewith, is provided at the approximate opposite end of the clutch, and intermediate the location of the driven means rotatable member 11, and the driving means 2 located inwardly thereof. Thus, the interior of the structured support 12 provides a fully sealed and contained volumetric area, and wherein the operating components of this clutch are located, and which may be lubricated through the location of an oil therein.

Each adjustment means 15 includes an adjustable screw 22 being held into its adjusted position by means of an associated locking nut 23, with the adjustable screw 22 biasing against a spring means 24 located interiorly of the structured support 12, and within the apertures 14 as previously explained. The inner end of the spring 24 biases against a first race 25, which in turn is bearing mounted, as at 26, against another race 27, which in turn biases against the ball detents 8, particularly as shown in FIGS. 4 and 5. Thus, it can be seen that adjustments made to the adjustable screws 22, particularly when forced inwardly within their threaded connection within the aperture 14, bias against the various races 25 and 27, so as to exert pressure upon the ball means 8, so that once the same is seated within their bearing seats 9, they will remain therein unless excessive torque is encountered that causes an urging upwardly of the races 25 and 27, and their intermediate bearings 26, so as to allow for an unseating of the ball detents 8 from their respective bearing seats 9. When this occurs, while the driving means 2 may continue to rotate, the rotatable member 11, which is a component and integral part of the driven means 3, will eventually curtail its revolving, so long as the ball detents 8 remain unseated from their seats 9, or until such time as the driving means 2 may slow down or be abruptly curtailed in its rotation, thereby allowing the ball detents to once again reseat within their bearing seats 9. Generally, this may usually occur only upon a relatively forward rotation or the driving means with respect to the driven means, particularly if the combination ball detents 8 and bearing seats 9 are unequally staggered around the circumference of the rotatable member 11, thereby providing inherent single positioning features for this disconnect clutch. On the other hand, if the ball detents and their bearing seats are equally spaced around the circumference of the surface of the rotatable member 11, then the ball detents need only travel that distance representative of a segment between two bearing seats, in order to reseat once again, provided that the degree of torque encountered has been reduced below that which previously caused the clutch's disconnection, and that which has been determined sufficient to maintain connection between the driving and driven means for the same.

The reason for the locating of a series of bearings 26, and intermediate the races 25 and 27, is that in the event that ball detents 8 are urged into unseating from their bearing seats 9, the race 27 will be provided with some freedom for circumferential turning with respect to the race 25, and the stationary springs 24 biasing thereagainst, and such freedom of movement for the ball detents is obtained due to the presence and positioning of the said bearings 26. Thus, slight movement of the race 27 can be accomplished with respect to the race 25 through the agency of these located radial bearings 26.

In addition, and as previously explained, means are provided for authorizing automatic shut-off of the associated prime mover or electrical motor, in addition to the machinery itself, when excessive torque is encountered, and clutch disconnection occurs. This is provided through the agency of the positioning of a micro or other switch 28 externally of the clutch, and held stationary with respect thereto, and which switch is positioned for being contacted by an axially movable plate or actuator plate or member 29, and which plate is positioned for mounting upon rods 30. The rods 30, at their inner ends, are threadedly engaged within the race 25, as can be seen, while their external ends are secured by means of a fastener, such as the nut 31, as shown, to the plate 29. In addition, and as to prevent the leakage of any lubricating fluids from the interior of the structured support 12, as previously explained, an O-ring 32 is provided upon each rod 30 so as to form a sealing relationship between the rod, and the aperture within the structured support 12 and through which the rod extends to attain an exterior positioning, as shown. As can be seen, as at the hidden line 33, when the race 25 is lifted as the ball detents 8 are being unseated, the plate 29 is urged against the microswitch 28, actuating the same, and which switch control can then operate other electrical instrumentalities for shutting off all power to the machinery, if such is desired.

In referring to FIG. 5, a variation on the mounting means used in conjunction with particularly the driven means 3, or more specifically its rotatable member 11, is shown, and in this particular instance comprises an optional form of flexible coupling 34 that is useful for authorizing the clutch to be connected to another shaft, which is to be driven through the agency of this device. This coupling 34 secures by means of additional screws 37, and through the agency of an elastomeric bushing 38, with the adapter 35, and the hub has a central and integral sleeve-like portion 39 which is disposed for having a collar or bushing 40 secured therewith through the agency of the fasteners 41. Then, another shaft (not shown), such as from the machinery being rotated, will couple with the collar 40 for rigid securement to the driven means 3, and to be rotated during its normal revolving through the agency of the driving means 2. But, when disconnection occurs, such as when the ball detents rise out of their bearing seats 9, while the driving means 2 may continue to rotate, i.e., until the microswitch 28 is actuated, the driven means 3, and its associated adapter 34, will be reduced in rotation or stopped from turning altogether.

Variations or modifications to the structure of this torque limiting clutch may appear to those skilled in the art upon reviewing the subject matter of this invention. Such variations or modifications, if within the sprit of this invention, are intended to be encompassed within the scope of any claims to patent protection issuing hereon. The description of the preferred embodiment set forth in detail herein is done so for illustrative purposes only.

Having thus described the invention what is claimed and desired to be secured by Letters Patent is:

1. An improved torque limiting clutch for use in retaining driving and driven members together during normal usage of machinery but effecting disconnection of said members when a maximum predetermined torque is exceeded, comprising, said clutch including a driving member and a driven member, said driving member including a shaft coupling element extending substantially through the driven member, an integral flange extending from the inner end of the driving member, a series of detent means, said detent means arranged for containment by said flange, said driving member flange having at least one opening therethrough for loosely containing said detent means therein, said driven member including a connecting rotatable element, said rotatable element having a surface contacted by said detent means, said surface including a seat for each detent means and normally seating a detent means during routine machinery usage, said surface including a race means upon which the detent means ride when the driving and driven members of the clutch disconnect as when the predetermined torque is exceeded, structured support means connecting with said rotatable element of the driven member, said support means extending concentrically of the length of said clutch, spring biasing means arranged within said structured support means and at one end pressuring against the detent means to maintain their seating relationship within the rotatable element seats as during a normal operating condition of the clutch and accompanying machinery, at least one adjustment means provided contacting the opposite end of said spring means, said adjustment means connecting with the structured support means and capable of being readjusted for varying the pressure applied upon the detent means and consequently the amount of excessive torque required before clutch disconnection occurs, a first race comprising an annular ring contacting the detent means upon a side opposite from their seating within the rotatable element seats, a second race arranged spacedly from said first race, radial bearing means arranged intermediate said races, said spring biasing means disposed against said second race for urging and maintaining the detent means seating upon said first race and to facilitate movement for the detent means to unseat from the rotatable element seats, switch means responsive to the movement of one of said races during detent means unseating and effecting shut-off of the driving member during clutch disconnection, including rod means at one end secured to the said second race, said rod means at the opposite end extending out of the structured support means, a plate means securing to the opposite end of the rod means and positioned for contacting and actuating the switch means during clutch disconnection.

* * * * *